United States Patent [19]

Heinerman et al.

[11] Patent Number: 5,045,518

[45] Date of Patent: Sep. 3, 1991

[54] PROCESS FOR THE PREPARATION OF A SULFIDED CATALYST

[75] Inventors: Jacobus J. L. Heinerman, Amsterdam; Johannes W. F. M. Schoonhoven, Leusden, both of Netherlands

[73] Assignee: Akzo N.V., Arnhem, Netherlands

[21] Appl. No.: 534,914

[22] Filed: Jun. 8, 1990

[30] Foreign Application Priority Data

Jun. 13, 1989 [NL] Netherlands .................. 8901493

[51] Int. Cl.$^5$ .................. B01J 27/04; B01J 27/043
[52] U.S. Cl. .................. 502/216; 502/220; 502/221
[58] Field of Search .................. 502/216, 220, 221

[56] References Cited

U.S. PATENT DOCUMENTS

| | | | |
|---|---|---|---|
| 3,528,910 | 9/1970 | Haney et al. | 502/220 X |
| 3,915,894 | 10/1975 | Clements et al. | 502/220 |
| 4,530,917 | 7/1985 | Berrebi | 502/220 |
| 4,547,285 | 10/1985 | Miller | 208/216 R |
| 4,719,195 | 1/1988 | Toulhoat et al. | 502/220 X |
| 4,725,571 | 2/1988 | Tuszynski | 502/220 |

FOREIGN PATENT DOCUMENTS 0153233 2/1985 European Pat. Off. .
0352851 1/1989 European Pat. Off. .

OTHER PUBLICATIONS

M. de Wind et al., Upflow Versus Downflow Testing of Hydrotreating Catalysts, Mar. 28/29, 1988, pp. 239-252.
H. Hallie, Experience Reveals Best Presulfiding Techniques for HDS and HDN Catalysts, Oil and Gas Journal Technology, Dec. 20, 1982, pp. 69-74.

*Primary Examiner*—W. J. Shine
*Attorney, Agent, or Firm*—James K. Poole; Louis A. Morris

[57] ABSTRACT

Disclosed are the preparation of a sulfided catalyst and the use of said catalyst in the hydrotreatment of hydrocarbon feeds. The sulfidation is carried out by ex situ presulfiding of a fresh or regenerated catalyst, followed by the resulting material being contacted in situ at elevated temperature with hydrogen gas in combination with either a sulfiding agent, e.g., hydrogen sulfide, or a spiked feed.

4 Claims, No Drawings

PROCESS FOR THE PREPARATION OF A SULFIDED CATALYST

BACKGROUND OF THE INVENTION

1. Field of the Invention

The invention relates to a process for the preparation of a sulfided catalyst and the use of the thus prepared catalyst in the hydrotreatment of hydrocarbon feeds.

2. Prior Art

In the oil industry many processes are known in which hydrocarbon-containing feeds are catalytically treated with hydrogen, such as hydrodesulfurizing, hydrodenitrogenizing, and hydrocracking. In such processes use is made of catalysts built up from a carrier material such as alumina, on which there are deposited one or more catalytically active metals or compounds thereof; examples of such metals include molybdenum, nickel, cobalt, and tungsten. It is common knowledge that optimum results are obtained in using such catalysts when the catalytically active metals are in their sulfided form.

In actual practice sulfiding is generally carried out in situ, i.e. in the reactor in which the final hydrotreatment of the hydrocarbon-containing feed is carried out. Having been introduced into the reactor, the fresh or regenerated catalyst during the start-up procedure is contacted at elevated temperature with a hydrogen gas stream mixed with a sulfiding agent or a hydrogen gas stream combined with a hydrocarbon-containing feed containing an added sulfiding agent (a so-called spiked feed), said sulfiding agent being either hydrogen sulfide or a compound that under the prevailing conditions is decomposable into hydrogen sulfide. In this connection see, a.o., H. Hallie's article in Oil & Gas Journal, Dec. 20, 1982, Technology, pp. 69-74.

A recent development in this field is so-called ex situ presulfiding. In this process the fresh or regenerated catalyst in a first step is treated (impregnated) with a sulfur compound, e.g. a polysulfide, outside the reactor in which the final hydrotreatment of hydrocarbon-containing feed is carried out, and then, if necessary, dried. Next, in a second step, the material is treated with hydrogen gas in the presence or not of a feed in the reactor (in situ) at elevated temperature to activate the catalyst, i.e. bring it into the sulfided state. In this connection see European Patent Applications 0,153,233 and 0,352,851 and U.S. Patent No. 4,530,917 an equivalent of European patent application 0,130,850 and French patent application 83 11048.

Although sulfided catalysts of acceptable activity are produced by either in situ or ex situ presulfiding, it has surprisingly been found that sulfided catalysts of even greater activity can be obtained by a preparative process that combines both methods.

SUMMARY OF THE INVENTION

Accordingly, the present invention comprises a process for the preparation of a sulfided catalyst for the catalytic hydrotreatment of hydrocarbon-containing feeds, comprising presulfiding ex situ a catalyst comprising a carrier material having one or more catalytically active metals or compounds of metals deposited thereon, and contacting the resulting material under sulfiding conditions with hydrogen to which a sulfiding agent has been added, or with hydrogen combined with a hydrocarbon-containing feed containing an added sulfiding agent, said sulfiding agent being selected from the group consisting of hydrogen sulfide and compounds that under the prevailing conditions are decomposable into hydrogen sulfide.

DETAILED DESCRIPTION OF THE INVENTION

The fresh or regenerated catalysts to be sulfided according to the process of the invention are those which are known in the prior art as suited for use in the sulfided form in the catalytic hydrotreatment of hydrocarbon-containing feeds, for instance in hydrodesulfurizing, hydrodenitrogenizing, hydrodemetallizing, hydroreforming (which process in the present context is also considered to be a hydrotreatment of hydrocarbon-containing feeds), hydroisomerizing, hydrocracking, hydroalkylating, and hydrodealkylating. Such catalysts generally contain a carrier material, such as alumina, silica, silica-alumina, or crystalline aluminosilicate, with deposited thereon one or more metals or compounds of metals, such as oxides, the metals being selected from the groups Ib, Vb, VIb, VIIb, and VIII of the Periodic System. Typical examples of these metals are iron, cobalt, nickel, tungsten, molybdenum, chromium, vanadium, copper, palladium, and platinum as well as combinations thereof. Preference is given to molybdenum, tungsten, nickel, cobalt, platinum, and palladium and combinations thereof. The metal content of the catalysts generally is 0.1-30 wt. %, calculated on the weight of the total catalyst. In addition, the catalysts may still contain other components, such as phosphorus, halogens, borium, zeolites, and clays—including pillared clays.

The shape of the catalysts is dependent on the process in which they are employed. Most frequently used are extruded particles (cylindrical, polylobes) and fluidizable particles.

In ex situ presulfiding the catalyst is contacted with a sulfur compound, use being made of conventional impregnation methods, such as impregnation, immersion, and impregnation by spraying.

The amount of sulfur compound to be used generally is selected so that there is deposited on the catalyst an amount of sulfur which, calculated on the sulfides that will finally be formed (e.g. $MoS_2$, $Co_9S_8$), is in the range of $0.5\times$ to $1.5\times$ the stoichiometrically required amount.

Usually, it is desired that the sulfur compound should be dissolved in or mixed with a solvent. Of course, the nature of the solvent is dependent on the type of sulfur compound. Both water and organic solvents may be used.

Examples of suitable sulfur compounds include
diammonium sulfide (see EP-A 0,153,233),
ethylene bis(dithiocarbamic acid) and salts thereof,
2,5-dimercapto-1,3,4-thiadiazole and salts thereof,
dimethyl dithiocarbamic acid and salts thereof,
thiourea,
ammonium thiocyanate,
thioglycolic acid and salts thereof,
dimethyl sulfoxide,
3,4-dithia adipic acid and salts thereof, and
2,2'-dithiodiethanol.

It should be noted that when a salt of a sulfur compound is used, it must not be an alkali metal salt or an alkaline earth metal salt. It is common knowledge that alkali metal ions and alkaline earth metal ions in catalysts have a negative effect on the catalytic action. Salts that are preferred, also for reasons of economy, are ammonium salts and mono-, di-, tri-, and tetra-alkyl ammonium salts. The methyl group is the most suited alkyl group.

Further examples of suitable sulfur compounds are those that meet the general formula $$R-S_n-R'$$

wherein n represents an integer number of 2-20, preferably of 3-7, R and R' may be the same or different and represent an organic radical, and R and R' also may be hydrogen. As a rule, the organic radical will contain 1-60 carbon atoms. Preferably, the organic radical is an alkyl group that may be branched or not, an aryl group, an aralkyl group, or an alkaryl group. Especially preferred are those compounds in which n=5 and R and R' each represent a t-nonyl group or a t-dodecyl group. For further details see EP-A 0,130, 850 and U.S. Pat. No. 4,530,917, in which mention is also made of a number of suitable solvents, such as white spirit and various gasoline fractions.

Of course, a combination of two or more sulfur compounds may also be used to carry out the present presulfiding.

In general, it is preferred to make use of water-soluble sulfur compounds.

After the sulfur compound has been deposited on the fresh or regenerated catalyst, there will, as a rule, have to be a drying step to remove solvent remainders. To this end use may be made of conventional equipment, such as ovens and belt driers.

The thus presulfided catalyst is next introduced into the reactor in which the final hydrotreatment of the hydrocarbon-containing feed is carried out and contacted with a hydrogen gas stream mixed with a sulfiding agent or with a hydrogen gas stream combined with a spiked feed in a manner known in itself at elevated temperature. So, this step differs from the above-described in situ sulfidizing much applied in actual practice only in that the catalyst material to be treated is not fresh or regenerated catalyst but catalyst material pre-sulfided in advance and ex situ. Thus, the conditions under which this step is carried out are well known to the man skilled in the art. However, tests have shown that, as compared with in situ sulfiding by prior art methods, the present in situ step in some cases may take less time (varying from about as long to about 1/10 of the time). Generally, with mixtures of hydrogen and a sulfiding agent favorable results are obtained at a temperature in the range of 100°-650° C., in which case the gas mixture may contain 1-99% by volume of the sulfiding agent. The usual space velocity in this case will be in the range of 150-500 hours$^{-1}$. In this embodiment the preferred sulfiding agent is hydrogen sulfide.

The use of a spiked feed will be illustrated in the examples below. Preferred sulfiding (spiking) agents are carbon disulfide, dimethyl sulfide, dimethyl disulfide, and ethyl mercaptan. The amount of spiking agent will generally be so chosen that the spiked feed contains in the range of 0.2 to 5 wt. % of added sulfur. Usual temperatures will as a rule be in the range of 100°-500° C., usual pressures in the range of 20-200 bar.

Preferred is the embodiment that makes use of a spiked feed.

The thus prepared catalyst is suited to be used in the catalytic hydrotreatment of hydrocarbon-containing feeds. The most significant of these processes are hydrodesulfurizing, hydrodenitrogenizing, hydrodemetallizing, hydroreforming, hydroisomerizing, hydrocracking, and mild hydrocracking. Preferably, the catalyst is used for hydrodesulfurizing refinery streams, such as residual streams, vacuum gas oils, vacuum distillates, atmospheric distillates, and thermally or catalytically cracked hydrocarbon-containing feeds. Especially favorable results are obtained when treating atmospheric distillates containing up to 2% by weight of sulfur.

The process equipment to be used and the conditions under which the reactions are carried out vary with the process used and have been described in detail in the prior art. See, e.g., M. de Wind et al., Proceedings of symposium on catalyst performance testing, March 28/29, 1988, pp. 29-42; published by Unilever Research Laboratories, Vlaardingen, The Netherlands.

Very generally, the following reaction conditions apply here: temperatures in the range of 200°-500° C., LHSV values in the range of 0.1 to 10 hours$^{-1}$, partial hydrogen pressures in the range of 10-300 bar, and hydrogen/hydrocarbon ratios in the range of 50 to 5000 Nm$^3$/m$^3$.

The invention will be further described in the following examples.

EXAMPLE 1 (COMPARATIVE EXAMPLE)

Into a reactor tube were introduced 75 ml of a fresh KF-165 ® catalyst (ex Akzo Chemicals: composition: 15.4 wt. % of MoO$_3$, 4.2 wt. % of CoO, alumina; PV(H$_2$O): 0.46 ml/g). The reactor tube had a diameter of 21 mm and in longitudinal direction it contained a thermocouple tube with a diameter of 6 mm. The length of the catalyst bed was 45 cm. First the reactor was flushed with nitrogen to remove air. Next, hydrogen gas was passed upwardly over the catalyst at a pressure of 60 bar and at a flow rate of 65 l/hour, the temperature being increased from room temperature to 100° C. in a period of 1 hour. At this temperature a light gas oil (LGO) which had been spiked with 2.5 wt. % of sulfur in dimethyl sulfide form was admixed in the hydrogen gas stream at a flow rate of 300 ml/hour. (The relevant data on the LGO itself, i.e. without spiking agent, is given in Table 1.) After 3 hours the flow rate of the spiked LGO was reduced to 100 ml/hour. Gradually, over a period of 8 hours, the temperature was raised to 320° C. and then kept at this value for 12 hours.

The resulting sulfided catalyst contained a stoichiometric amount of sulfur.

Subsequently, the catalyst was used in the same reactor for hydrotreating a vacuum gas oil (VGO), the relevant data on which is provided in Table 1. One treatment was carried out at a temperature of 368° C., a partial hydrogen pressure of 50 bar, a hydrogen to oil ratio of 300, and an LHSV of 2.67 hours$^{-1}$. Some other treatment was carried out at an LHSV of 1.33 hours$^{-1}$, given otherwise identical conditions. The data obtained was used to determine the relative volume activity (RVA) of the catalyst for desulfurizing, which RVA was set at 100 for comparative ends and to serve as the standard (see Table 2). RVA is defined as follows:

$$RVA = \frac{k_{sample}}{k_{standard}} \times RVA_{standard}$$

With the use of the proper reaction order the defined RVA results in data which are comparable to the ratio of space velocities between sample and standard to obtain equal hydrodesulfurization.

The reaction rate constant derives from integration of the mass balance over the reactor when ideal plug flow in the reactor is assumed.

$$k = LHSV \times \frac{1}{n-1} \left[ \frac{1}{S^{n-1}} - \frac{1}{S_o^{n-1}} \right]$$

where:
LHSV = liquid hourly space velocity, m³/m³/h
n = predetermined reaction order
$S_o$ = sulfur in feed, wt %
S = sulfur in product, wt %.

EXAMPLES 2

The experiment of Example 1 was repeated, except that the KF-165 ® catalyst was replaced with a KF-165 ® catalyst which had been presulfided ex situ in advance. Presulfiding was as follows. In a rotating impregnator 1 kg of KF-165 ® was impregnated at room temperature with an aqueous solution prepared by dissolving 1.32 moles of 2,2'-dithiodiethanol in such an amount of water that the total volume was 460 ml, use being made of the pore volume saturation technique. After impregnation the material was dried in an oven at 100 ° C. for 15 hours. The thus presulfided catalyst contained a stoichiometric amount of sulfur.

The value found for the RVA is given in Table 2.

EXAMPLE 3 (COMPARATIVE EXAMPLE)

The experiment of Example 2 was repeated, except that dimethyl sulfide was not added to the LGO during the in situ treatment with hydrogen and LGO (non-spiked feed).

The value found for the RVA is given in Table 2.

EXAMPLE 4

The experiment of Example 1 was repeated, except that the KF-165 ® catalyst was replaced with a KF-165 ® presulfided ex situ in advance by impregnation with a solution of di-t-nonyl pentasulfide (R-$S_n$-R' wherein R = R' = t-nonyl and n = 5) in white spirit and the material being dried in an oven at 100° C. in accordance with the method described in EP-A 0,130,850 and U.S. Pat. No. 4,530,917. The thus presulfided catalyst contained a stoichiometric amount of sulfur.

The value found for the RVA is given in Table 2.

EXAMPLE 5 (COMPARATIVE EXAMPLE)

The experiment of Example 4 was repeated, except that dimethyl sulfide was not added to the LGO during the in situ treatment with hydrogen and LGO.

The value found for the RVA is given in Table 2.

TABLE 1

| Feed | N (wt. ppm) | S (wt. %) | Density 50° C. (g/ml) | Boiling pnt fractions (°C.) | | | | |
|---|---|---|---|---|---|---|---|---|
| | | | | 10% | 30% | 50% | 70% | 90% |
| LGO | 92 | 1.17 | 0.8145 | 224 | 262 | 288 | 313 | 349 |
| VGO | 970 | 2.93 | 0.9018 | 391 | 421 | 451 | 486 | 527 |

TABLE 2

| Example | RVA |
|---|---|
| 1* | 100 |
| 2 | 121 |
| 3* | 110 |
| 4 | 115 |
| 5* | 96 |

*comparative example

With reference to Table 2 it is noted that
a difference of 5 RVA units is hardly if at all significant, while a difference of 10 RVA units is,
the results show that the process according to the invention produces catalysts that are more active than those that have been sulfided in situ exclusively (compare Examples 2 and 4 with Example 1) and also than those that have been presulfided ex situ and subsequently activated in situ with hydrogen but without a spiking agent in the accompanying feed (compare Example 2 with Example 3 and Example 4 with Example 5).

We claim:

1. A process for the preparation of a sulfided catalyst for the catalytic hydrotreatment of hydrocarbon-containing feeds, comprising presulfiding ex situ a catalyst comprising a carrier material having one or more catalytically active metals or compounds of metals deposited thereon and subsequently contacting resulting material in situ under sulfiding conditions with hydrogen to which a sulfiding agent has been added or with hydrogen combined with a hydrocarbon-containing feed containing an added sulfiding agent, said sulfiding agent being selected from the group consisting of hydrogen sulfide and compounds that under the prevailing conditions are decomposable into hydrogen sulfide.

2. A process according to claim 1 wherein the presulfiding step employs a solution of a sulfur compound in water.

3. A process according to claim 1, wherein the presulfiding step employs a solution of a sulfur compound in an organic solvent.

4. A process according to claim 1 wherein the ex situ presulfiding step comprises contacting the catalyst material with a sulfur compound by an impregnation process.

* * * * *